Jan. 30, 1962
R. HAYDOCK
3,018,506
CASTER INSERT SOCKET
Filed May 9, 1958
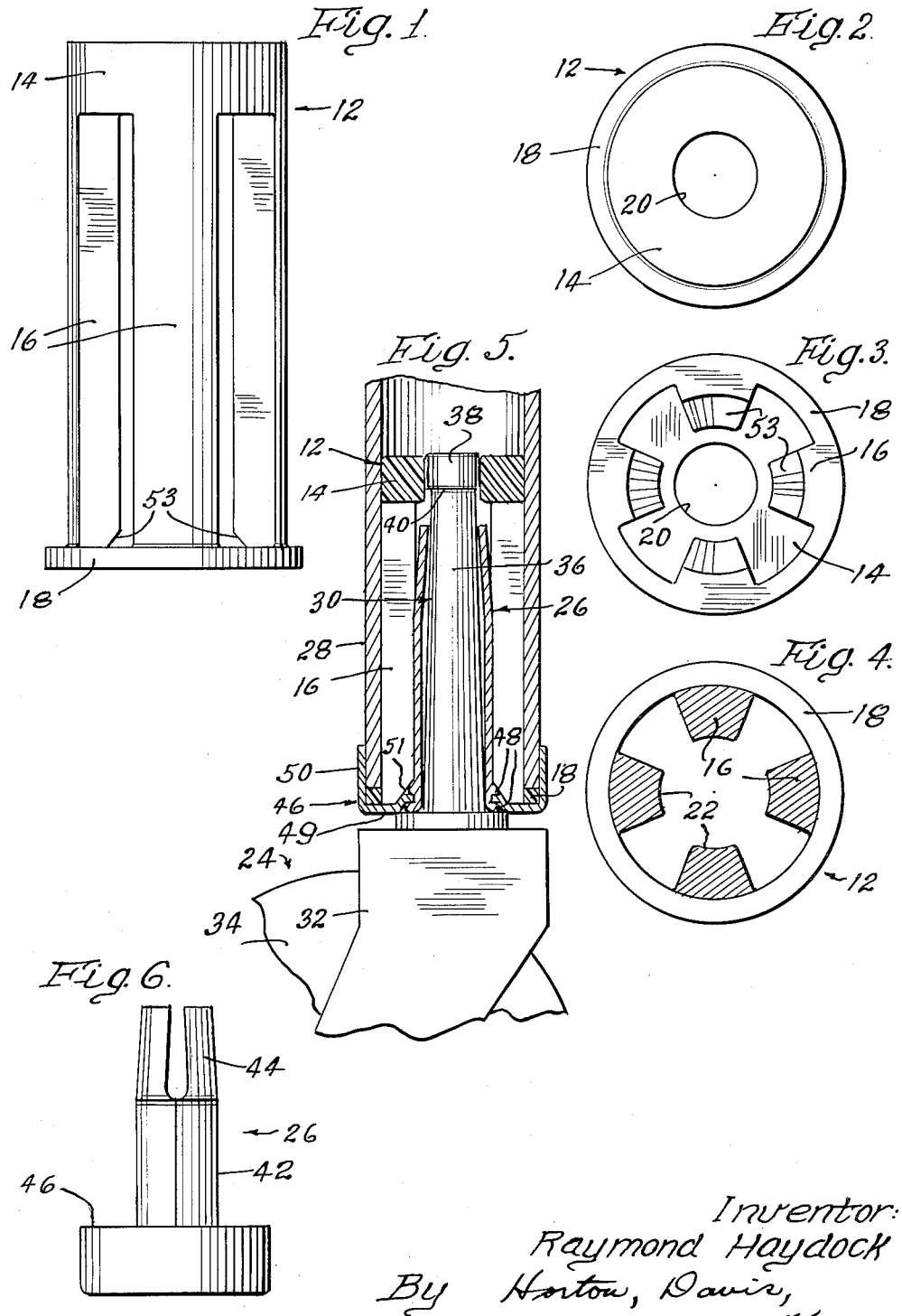
Inventor:
Raymond Haydock
By Horton, Davis,
Brewer & Brugman
Attys

United States Patent Office 3,018,506
Patented Jan. 30, 1962

3,018,506
CASTER INSERT SOCKET
Raymond Haydock, 6711 Lightfoot Ave., Chicago 46, Ill., assignor to Raymond Haydock, trustee, Chicago, Ill.
Filed May 9, 1958, Ser. No. 734,192
1 Claim. (Cl. 16—20)

The present invention relates to casters and more particularly to an insert socket for use with a caster.

An object of the invention is to provide an insert socket for use in an assembly with a caster in a furniture leg, effective for accommodating misalignment between the caster and the furniture leg whereby the caster can freely and easily swivel notwithstanding such misalignment.

A more specific object is to provide an insert socket of the character mentioned, of resilient character so as to accommodate misalignment between the caster and the furniture leg.

Another object is to provide an insert socket of the foregoing character which is uniformly resilient in all directions and accommodates any misalignment that may occur between the caster and furniture leg with which it is associated equally well in all directions about the axis of the furniture leg.

A further object is to provide an insert socket of the character mentioned that can accommodate a caster and sleeve of standard construction.

A further object is to provide an insert socket of the character mentioned that securely retains the caster assembly, of which it forms a part, in the furniture leg with which it is associated, solely by friction.

A still further object is to provide an insert socket which with a conventional caster and sleeve can be effectively entirely concealed within the furniture leg, resulting in a trim appearance.

Still another object is to provide an insert socket that is especially effective in use with a metal furniture leg, as compared with kinds of caster assemblies heretofore known.

A still further object is to provide an insert socket for use in a caster assembly in which the caster is provided firm support at two widely spaced points between the pintle of the caster and the insert socket.

Other objects are to provide an insert socket of the character mentioned that does not require accuracy in its manufacture, and that is simple and inexpensive and can be inserted in place by the relatively unskilled.

Other objects and advantages of the invention will appear from the following detail description taken in conjunction with the accompanying drawings in which:

FIG. 1 is a side elevational view of the insert socket embodying the features of the present invention;

FIG. 2 is a top view of the insert socket;

FIG. 3 is a bottom view;

FIG. 4 is a sectional view taken on line 4—4 of FIG. 1;

FIG. 5 is an axial sectional view of a caster assembly including a furniture leg, a caster, a sleeve and the insert socket of the present invention; and FIG. 6 is a side elevational view of the caster sleeve included in the assembly of FIG. 5.

Referring now in detail to the drawings, the insert socket shown in FIGS. 1 to 4, inclusive, and indicated at 12, is a single integral piece or member of resilient material and is preferably made of a known plastic material such, for example, as polyethylene. This material possesses the desired degree of resiliency, but the necessary firmness required for normally maintaining the caster in the assembly in which it is included in or substantially in alignment with the furniture leg in which it is incorporated.

The piece or member 12 is generally of tubular or sleeve-like formation and includes at an upper end an annular portion 14 and a plurality of downwardly or longitudinally extending legs 16, extending from the annular portion 14. At the extended or lower end of the legs is a rim or bead 18 which forms a radially outwardly extending flange relative to the outer surface of the legs 16.

The annular portion 14 may be of relatively minor length in axial direction, as indicated in FIG. 1, and has a central hole 20.

The legs 16 are preferably four in number and are wedge-shape in cross section, with rounded concave inner surfaces 22 defining a surface that is or approaches a cylindrical surface. The annular portion 14 and the legs 16 define a common outer surface that is substantially cylindrical in shape. The radial extent of the legs 16 is preferably slightly less than that of the annular portion 14, the hole 20 thus being slightly smaller than the cylindrical surface defined by the surfaces 22 of the legs. The circumferential extent of each leg 16 may be similar to the circumferential extent of the space between adjacent legs, although the said dimensions of the legs are not critical, the main consideration being sufficient mass and consequent strength to provide the necessary support for the caster while permitting the desired shifting movements of the caster.

The insert socket of the invention is adapted for use in a caster assembly of the kind illustrated in FIG. 5 and this assembly includes a caster 24 of conventional construction, a sleeve 26 (see also FIG. 6) also of conventional construction, and a furniture leg element 28 which similarly is of conventional construction. The insert socket is especially adapted to use with a metal, hollow tubular leg of a piece of furniture, such furniture leg element being illustrated in FIG. 5. This leg element is of uniform construction and in the illustrated embodiment consists simply of a metal tubular element.

The caster 24 includes a pintle 30 secured to a fork or yoke 32 in which is journalled the caster wheel 34. The pintle 30 includes a shank portion 36 which preferably tapers upwardly to a relatively enlarged head 38 in which it terminates, the latter defining a downwardly facing shoulder 40.

The sleeve 30 includes a tubular element or sleeve proper 42 which may be made of a sheet of material shaped to form a split sleeve. The upper end of the element 42 is constricted, as shown at 44, being composed of opposite elements that can be sprung apart a limited amount for enabling the head 38 to pass therethrough, while assuming a normal position spaced apart a distance less than the diameter of the head 38 so as to engage the shoulder 40 for retaining the pintle in place in the sleeve. At the lower end of the element 42 is a cup-shaped fitting 46 secured to the lower end of the element 42 in a conventional manner. The particular connection construction between the elements 46 and 42 is shown in FIG. 5, in which the lower end of the sleeve element 42 has beads 48 crimped above and below the marginal edge of a hole in the cup-shaped member. The member 46 has an axially extending flange 50 which fits over the end of the furniture leg in the final assembly.

The insert socket 12 is of preselected dimensions such that its outside diameter is substantially equivalent to the inside diameter of the leg element 28 which by its tubular construction forms a recess for receiving the insert socket. The dimensions of the insert socket and leg element are such as to establish a firm friction fit therebetween so that the insert socket when placed in the leg element remains therein in the absence of unusual external forces applied thereto, and in the normal use of the furniture. The insert socket is inserted in the leg element 28 to the position shown in FIG. 5 in which the bead or flange 18 engages the lower end edge surface of the leg element. The bead or flange 18 serves primarily as a means for limiting the extent of insertion of the insert socket into the leg element 28 and thus flange portions connected only with the legs, and not extending between the legs will serve adequately for this purpose, but, for convenience in molding the article, the bead or flange 18 is made continuous around the article.

The next step in forming the assembly is to place the sleeve 26 in position and this is done merely by inserting the sleeve element 42 into the insert socket to the position shown in FIG. 5, wherein the cup-shaped member 46 engages and is limited by the lower end of the insert socket. The sleeve element 42 has high friction engagement with the legs 16, and in fact preferably compresses the legs, at least a slight amount, as shown in FIG. 5. In such position of the member 26, the flange 50 engages in surrounding relation, the bead or flange 18 and the outer surface of the lower end portion of the leg element 28. The dimensions of the various elements are pre-selected so that there is substantial friction engagement between the bead or flange 50 and the flange 18, as well as between the flange 50 and the leg element 28.

The end element 49 of the member 46, as made according to present and known methods, customarily includes a conical portion 51 and to accommodate this conical portion the extended end surfaces of the legs 16 are provided with a complementally shaped conical or inclined portion 53 shown in FIGS. 3 and 5. The dimensions of the various interengaging portions of the members are such, therefore, that there is firm engagement between the cup-shaped member 46 and the other members in the assembly.

The dimensions of the various elements are furthermore preselected so that the sleeve element 42 frictionally engages the inner surface of the legs 16 and by reason of this frictional engagement in addition to the frictional engagement referred to above, the sleeve is firmly retained in assembly in the said socket. The insert socket is of such length that the sleeve element 42 terminates short of the annular portion 14 in the assembly, as shown in FIG. 5.

As the final step in assembling the various members, the caster is put in place in the assembly. This is done by inserting the pintle 30 into the sleeve 26, and the head 38 is driven through the constricted portion 44. The length of the insert socket is so preselected that the head 38 extends at least into the hole 20 and preferably terminates adjacent the upper surface of the insert socket. The dimension of the hole is preferably such as to receive the head 38 in a snug fit so as to provide the desired reaction for the upper end of the pintle in the tilting movements of the pintle.

The assembly of the various members thus described provides a firm support for the caster as well as permitting the desired resilience to accommodate misalignment between the caster and furniture leg. As is known, a caster swivels most freely only when it is in direct vertical position. Normally, the caster is intended to be maintained in direct alignment with the leg of the furniture in which it is used, the leg also being disposed directly vertical. However, when the furniture leg loses its exact vertical positioning, and becomes slightly cocked or canted, the swivelling action of the caster is impeded. In the assembly utilizing the insert socket of the present invention, according to the above description, the resilience of the insert socket enables the caster to maintain its vertical alignment in its swivelling movement notwithstanding any such misalignments of the furniture leg. The relative misalignment between the caster and the furniture leg is accommodated not only by the resileince of the material from which the insert socket is made, but also the fact that the legs 16 are enabled to shift and weave a limited extent relative to one another and relative to the caster.

The caster is provided support and reaction by the insert socket at two widely spaced points, namely, at the upper end of the pintle by the annular portion 14, and at the lower end of the pintle through the lower end of the sleeve element 42 and the lower end of the legs 16.

The caster is maintained in the furniture leg 28 solely by friction, i.e., the insert socket is retained in the furniture leg solely by friction and similarly the sleeve 26 is retained in the insert socket by friction. However, the pintle 30 is retained in the sleeve by a positive engagement between the shoulder 40 and the upper end of the respective portion 44. The sleeve 26 is normally retained against rotating or swivelling movement, by friction, but the caster has a free swivelling movement relative to the sleeve 26.

The insert socket need not be accurately formed since the desired frictional engagement between the insert socket and the members which it engages is provided even though inaccuracies may be present.

Another advantage of the invention is that the insert socket will absorb at least initial portions of shock to the caster, such for example as in rolling the piece of furniture in which the caster is used, on the floor. In such movements, the caster, of course, follows the uneveness in the floor and in the normal movement of the furniture, the caster makes relatively fast movements. The initial shock imposed by such fast movements is to a great extent dissipated by the insert socket, and prolonged shock from this source does not persist.

The furniture leg 28, the caster 24 and the sleeve 26 are all of conventional construction, as pointed out above and are readily accommodated by the novel insert socket of the invention.

The material from which the insert socket is made has a long life and retains its resiliency effective for maintaining the caster in proper vertical alignment substantially throughout the life of the furniture or the caster.

The insert socket of the present invention is especially adapted to use with metal furniture legs, and the assembly produces a trim and pleasing appearance to the furniture leg.

While I have shown herein a certain preferred embodiment of the invention, it will be understood that changes may be made therein within the scope of the appended claim.

I claim:

A caster assembly combination comprising a furniture leg element, a caster, a sleeve and an insert socket, said furniture leg element having a recess of predetermined diameter, said caster having a pintle of predetermined length, said sleeve surrounding the caster pintle and being of less length than the pintle, said insert socket including a single integral sleeve-like member of universally resilient material including an upper continuous annular portion defining a central hole opening in at least downward direction and circumferentially spaced downwardly extending legs, and an outwardly extending flange at the lower ends of the legs, said insert socket being fitted in said recess in the furniture leg element and having a common outer surface of substantially cylindrical shape defined by said annular portion and legs of such diameter relative to that of the recess and having sufficient friction with the wall of the recess as to retain the assembly in the recess, and said flange engaging the lower end surface of the furniture leg element and serving to limit insertion of the socket into the recess, said sleeve frictionally engaging the inner surface of said legs and the sleeve and socket being of such relative dimensions as to provide sufficient friction to retain the sleeve in the socket, the insert socket, including the annular portion and legs, being of substantial thickness in radial direction and the material thereof yielding so as to be varied in thickness in response to forces applied on opposite sides of an element thereof in thickness direction, said sleeve extending a substantial distance into the insert socket but terminating short of said annular portion, the sleeve having a constricted upper end portion and the pintle having an enlarged head on its upper end projecting beyond the sleeve and forming a shoulder engaged by said constricted end portion of the sleeve whereby the caster is held in assembly with the pintle in the sleeve, and the upper end of the pintle extending at least as far as into the hole in said annular portion, said hole and enlarged head being so relatively dimensioned as to provide snug fit therebetween, whereby the annular portion provides a bearing element for the upper end of the pintle, and the caster is enabled to assume limited misalignment relative to the furniture leg element due to the resilience of the insert socket and in the movement of the caster into various positions of misalignment, the pintle has widely spaced points of reaction at the upper end of the insert socket in the annular portion and at the lower end of the insert socket through the lower end of the sleeve.

References Cited in the file of this patent

UNITED STATES PATENTS

| | | |
|---|---|---|
| 436,308 | Diss | Sept. 9, 1890 |
| 959,108 | Bent | May 24, 1910 |
| 1,232,688 | Johnson | July 10, 1917 |
| 1,458,812 | Fay | June 12, 1923 |
| 1,922,098 | Kilian | Aug. 15, 1933 |
| 1,929,743 | Jarvis | Oct. 10, 1933 |
| 2,169,882 | Noelting | Aug. 15, 1939 |